(12) United States Patent
Wagner et al.

(10) Patent No.: US 7,531,273 B2
(45) Date of Patent: May 12, 2009

(54) FULLERENE-BASED SECONDARY CELL ELECTRODES

(75) Inventors: Michael James Wagner, Rockville, MD (US); Louis Joseph Rendek, Jr., West Melbourne, FL (US); Robert Ellis Doe, Washington, DC (US); Dawson W. Cagle, New York, NY (US)

(73) Assignees: ITT Manufacturing Enterprises, Inc., Wilmington, DE (US); The George Washington University, Washington, DC (US)

( * ) Notice: Subject to any disclaimer, the term of this patent is extended or adjusted under 35 U.S.C. 154(b) by 671 days.

(21) Appl. No.: 10/970,663

(22) Filed: Oct. 22, 2004

(65) Prior Publication Data

US 2005/0158626 A1  Jul. 21, 2005

Related U.S. Application Data

(63) Continuation-in-part of application No. 10/703,527, filed on Nov. 10, 2003, now Pat. No. 7,129,003, which is a continuation of application No. 09/866,492, filed on May 29, 2001, now abandoned.

(60) Provisional application No. 60/514,538, filed on Oct. 27, 2003.

(51) Int. Cl.
*H01M 4/36* (2006.01)
*H01M 4/58* (2006.01)

(52) U.S. Cl. ............... 429/231.8; 429/213; 252/502; 977/734; 977/735

(58) Field of Classification Search .......... None
See application file for complete search history.

(56) References Cited

U.S. PATENT DOCUMENTS

| 5,114,477 | A | * | 5/1992 | Mort et al. | ............... 106/31.6 |
| 5,188,918 | A | * | 2/1993 | Ziolo | ............... 430/108.1 |
| 5,269,953 | A | | 12/1993 | Whewell | |
| 5,302,474 | A | | 4/1994 | Shackle | |

(Continued)

FOREIGN PATENT DOCUMENTS

EP  1548862 A1  6/2005

(Continued)

OTHER PUBLICATIONS

Diener and Alford, "Isolation and Properties of Small-Bandgap Fullerenes," Nature 393:668-671, 1998.

(Continued)

*Primary Examiner*—Jonathan Crepeau
*Assistant Examiner*—Tony Chuo
(74) *Attorney, Agent, or Firm*—Edell, Shapiro & Finnan, LLC (57) ABSTRACT

A composition for forming an electrode for a lithium ion secondary battery includes a carbonaceous material combined with a fullerene material including fullerene species having a carbon content of $C_n$, where $n \geq 100$. The composition is heated to a temperature of 100° C. or greater to facilitate reaction and/or diffusion of the fullerene material with the carbonaceous material, and also to remove lower molecular weight ($C_{<100}$) fullerenes from the composition. In addition, other extraction techniques may be utilized in combination with heat treatment to selectively remove fullerene species from the fullerene material. The composition enhances the electrochemical performance of the electrode in the lithium ion battery.

22 Claims, 3 Drawing Sheets

U.S. PATENT DOCUMENTS

| | | | |
|---|---|---|---|
| 5,304,366 A * | 4/1994 | Lorents et al. | 423/445 B |
| 5,380,703 A | 1/1995 | Kao et al. | |
| 5,395,496 A | 3/1995 | Tsantrizos et al. | |
| 5,447,796 A | 9/1995 | Tsukamoto et al. | |
| 5,470,680 A | 11/1995 | Louitfy et al. | |
| H1545 H | 6/1996 | Plichta et al. | |
| 5,538,814 A | 7/1996 | Kamauchi et al. | |
| 5,665,490 A | 9/1997 | Takeuchi et al. | |
| 5,705,296 A | 1/1998 | Kamauchi et al. | |
| 5,922,118 A * | 7/1999 | Johnson et al. | 106/31.6 |
| 5,952,125 A | 9/1999 | Bi et al. | |
| 6,025,462 A | 2/2000 | Wang et al. | |
| 6,136,287 A | 10/2000 | Horne et al. | |
| 6,146,791 A | 11/2000 | Loutfy et al. | |
| 6,280,697 B1 | 8/2001 | Zhou et al. | |
| 6,709,471 B2 | 3/2004 | Miyamoto | |
| 2004/0130693 A1 | 7/2004 | Kurt | |

FOREIGN PATENT DOCUMENTS

| | | | |
|---|---|---|---|
| JP | 1991000283832 | | 4/1993 |
| JP | 1992000116928 | | 11/1993 |
| JP | 1992000117226 | | 11/1993 |
| JP | 06-342655 | * | 12/1994 |
| JP | 07006764 | | 1/1995 |
| JP | 07014573 | | 1/1995 |
| JP | 07-296795 | | 11/1995 |
| JP | 407296799 | | 11/1995 |
| JP | 1994000107921 | | 11/1995 |
| JP | 08059220 | | 3/1996 |
| JP | 09320570 | | 12/1997 |
| JP | 10074518 | | 3/1998 |
| JP | 10097956 | | 4/1998 |
| RU | 2183190 | | 10/2002 |

OTHER PUBLICATIONS

Zhang et al., "The effect of different kinds of inert gases and their pressures on the preparation of carbon nanotubes by carbon are method", Materials Chemistry and Physics, vol. 58, Issue 1, Feb. 25, 1999, pp. 1-5.

Nalimova et al., "Lithium interaction with carbon nanotubes", Synthetic Metals 88 (1997) 89-93.

* cited by examiner

Fig. 3

FULLERENE-BASED SECONDARY CELL ELECTRODES

CROSS REFERENCE TO RELATED APPLICATIONS

This application claims priority from U.S. Provisional Patent Application. Ser. No. 60/514,538, entitled "Fullerene-Based Secondary Cell Electrodes", and filed Oct. 27, 2003, and this application is also a continuation-in-part of U.S. patent application Ser. No. 10/703,527, entitled "Fullerene-Based Secondary Cell Electrodes" and filed Nov. 10, 2003, now U.S. Pat. No. 7,129,003 which is a continuation of U.S. patent application Ser. No. 09/866,492, entitled "Fullerene-Based Secondary Cell Electrodes" and filed May 29, 2001 now abandoned. The disclosures of these patent applications are incorporated herein by reference in their entireties.

BACKGROUND OF THE INVENTION

1. Field of the Invention

The present invention relates to electrodes for lithium ion secondary (i.e., rechargeable) cells. In particular, the present invention relates to the fullerene-based anodes for lithium ion secondary batteries.

2. Description of the Related Art

Lithium ion secondary cells or batteries are commonly used as power sources in portable electronic devices. Such rechargeable cells generally use a lithium transition metal oxide (e.g., lithium colbaltate) positive electrode and a negative electrode composed of a highly porous carbonaceous material, typically graphite. However, the carbonaceous material may also include other carbons, metal and/or a pyrolyzed organic material. A lithium ion-soluble electrolyte is provided between the two electrodes, and the cell is charged. During the electrochemical process of charging, some of the lithium ions in the positive electrode migrate from the positive electrode (serving as the anode) and intercalate into the negative electrode (serving as the cathode). During discharge, the negative charge held by the negative electrode (now serving as the anode) is conducted out of the battery through its negative terminal and the lithium ions migrate through the electrolyte and back to the positive electrode (now serving as the cathode). While it is understood that the terms "anode" and "cathode" apply to each of the negative and positive electrodes depending upon whether the cell is being charged or is discharging, hereinafter the term "anode" is used to refer to the negative electrode and the term "cathode" is used to refer to the positive electrode.

Lithium ion batteries possess a number of advantages over other rechargeable cells, such as nickel metal hydride (Ni-MH), nickel-cadmium (Ni—Cd), lead-acid, and lithium cells. For example, the use of lithium in lithium ion cells provides a higher specific energy density for these cells, about three times more than Ni—Cd and lead-acid batteries and about two times more than Ni-MH batteries. The use of lithium also provides a higher cell voltage of up to 4 volts. In comparison, Ni—Cd and Ni-MH batteries provide about 1.2 volts, and lead-acid batteries provide about 2 volts. Lithium ion batteries have a much longer shelf life, self-discharging at about ¼ to about ½ the rate of Ni—Cd, Ni-MH and lead-acid batteries, and also experience little or no memory effect. Further, lithium ion batteries are relatively environmentally benign, since they contain no lead, cadmium or mercury, and are considered safer than rechargeable lithium cells due to their use of lithiated carbon material in place of metallic lithium.

While the current lithium ion battery technology is a considerable improvement over other secondary battery technologies (e.g., batteries employing nickel and lead), there are some disadvantages associated with such batteries. In particular, while lithium ion batteries with graphite anodes exhibit a high initial reversible capacity, the reversible capacity of the batteries rapidly fades over a number of charging and discharging cycles. While not being bound by any particular theory, this rapid capacity fade is believed to be caused by exfoliation of graphite and/or irreversible electrochemical reduction of electrolyte that occurs to form a solid electrolyte interphase (SEI) layer at the anode. Thus, the use of conventional lithium ion batteries is not suitable for use in applications requiring long term battery usage involving a large number (e.g., several thousands) of charging and discharging cycles.

It is therefore desirable to improve the cycling characteristics of lithium ion batteries so as to maintain high reversible capacity values (e.g., at or close to the theoretical value for graphite of 372 mAh/g) as well as high intercalation/deintercalation efficiencies of lithium ions over multiple battery cycles.

OBJECTS AND SUMMARY OF THE INVENTION

Therefore, in light of the above, and for other reasons that become apparent when the invention is described, an object of the present invention is to provide a composition for forming an electrode with enhanced electrochemical properties.

Another object of the present invention is to form an electrode with the composition that exhibits enhanced performance when implemented in a battery.

A further object of the present invention is to form a lithium ion secondary battery with the electrode that has a high reversible capacity that does not significantly decrease or fade over multiple cycles of the battery (e.g., several thousand cycles).

The aforesaid objects are achieved individually and in combination, and it is not intended that the present invention be construed as requiring two or greater of the objects to be combined unless expressly required by the claims attached hereto.

In accordance with the present invention, a composition for constructing an electrode is formed including a carbonaceous material combined with a fullerene material including fullerene species having a carbon content of $C_n$, where $n \geq 100$. Preferably, the fullerene material has a carbon content of $C_n$, where $100 \leq n \leq 250$. The carbonaceous material preferably includes graphite, while the fullerene material preferably includes a fullerene soot manufactured by at least one of an arc discharge process (e.g., the Kratschmer-Huffman process), a laser desorption process, and a combustion flame generation process. The composition is heated to a temperature of about 100° C. or greater to facilitate reaction and/or diffusion of the fullerene material with the carbonaceous material. In addition, the heat treatment is applied to the composition to remove a selected amount of lower molecular weight fullerenes (i.e., fullerene species having a carbon content of less than $C_{100}$) from the fullerene material by sublimation. Other extraction techniques (e.g., chemical extraction, chromatography, etc.) can also be utilized to extract different ranges of molecular weight fullerenes (e.g., lower molecular weight fullerenes) from the fullerene material of the composition. The composition may further include additional materials such as binder materials.

An electrode including the composition is used to form a lithium ion battery. Preferably, the electrode composition includes fullerene material in an amount no greater than about 30% by weight of the composition. Lithium batteries formed with electrodes including the composition formed according to the invention exhibit enhanced performance when compared with conventional lithium ion batteries.

The above and still further objects, features and advantages of the present invention will become apparent upon consideration of the following detailed description of a specific embodiment thereof, particularly when taken in conjunction with the accompanying figures.

DETAILED DESCRIPTION OF THE PREFERRED EMBODIMENTS

In accordance with the present invention, a composition with enhanced electrochemical properties for use in constructing an electrode for a lithium ion secondary cell is formed by combining a carbonaceous material and a fullerene material, and then heat treating the composition at a temperature of about 100° C. or greater. Preferably, a majority of lower molecular weight fullerenes, or fullerene species having a carbon content of $C_n$, where n<100 (e.g., $C_{60}$, $C_{70}$ and other $C_{<100}$ fullerenes), that were initially in the fullerene material are removed from the composition by sublimation during the heat treatment process, while at least some higher molecular weight fullerenes, or fullerene species having a carbon content of $C_n$, where n>100 (i.e., $C_{100+}$ fullerenes), remain in the composition. More preferably, the fullerene material is subjected to one or more suitable extraction processes to further remove a majority of molecular weight fullerenes having a carbon content of $C_n$, where n>250 (i.e., $C_{250+}$ fullerenes). Thus, it is most preferable that the composition include fullerene species having a carbon content of $C_n$, where $100 \leq n \leq 250$, since fullerenes in this molecular weight range provide very desirable electrochemical properties for the resultant electrode formed in accordance with the present invention.

The term "carbonaceous material", as used herein, refers to any carbon based material that is suitable for forming an electrode including, without limitation, graphite, lamellar graphite, pitch, coal pitch, coke, carbon black and/or other electrical conducting carbon materials, carbon-arc generated soot, and any combinations thereof. Graphite is a preferred material for forming the anode in a lithium ion battery because of its ability to provide an initial high reversible capacity for the battery. Optionally, the carbonaceous material may include graphite mixed with other carbonaceous materials. For example, the carbonaceous material may include primarily graphite combined with a small amount (e.g., about 1% to about 5% of the electrode composition) of one or more other electrical conducting carbon materials (e.g., carbon black).

The term "fullerene material", as used herein, refers to any product materials that are formed utilizing a fullerene generating process. The product materials include fullerene compounds and also any other carbon compounds generated in the process, such as incomplete (i.e., not completely formed and open) carbon shells. Exemplary fullerene generating processes include, without limitation, high-intensity laser desorption, arc discharge (e.g., a Kratschmer-Huffman process), and combustion flame generation. Optionally, the fullerene material, upon being formed by the fullerene generating process, may be further processed to separate or extract certain groups of fullerene compounds and/or other material from the fullerene material by any convenient means including, without limitation, diffusion methods, cooling of saturated solutions, precipitation with a solvent, sublimation or electrochemical methods, liquid chromatographic separation, and combinations thereof. Chemically or physically modified fullerene compounds such as fluorinated fullerenes or adducts and derivatives (such as, for example, those described in Cardulla et al., Helv. Chim. Acta 80:343-371, 1997; Zhou et al., J. Chem. Soc., Perkin Trans. 2:1-5, 1997; Okino et al., Synth. Metals 70:1447-1448, 1995; Okino et al., Recent Advances in the Chemistry and Physics of Fullerenes and Related Materials, vol. 3, 1996, pp. 191-199; Haddon et al., Nature 350:320-322, 1991; Chabre et al., J. Am. Chem. Soc. 114:764-766, 1992; Gromov et al., Chem. Commun. 2003-2004, 1997; Strasser et al., J. Phys. Chem. B 102:4131-4134, 1998; Cristofolini et al., Phys. Rev. B: Cond. Matter Mater. Phys. 59:8343-8346, 1999; Wang et al., Synthetic Metals 103(1):2350-2353, 1999; Wang et al., Mater. Res. Soc. Symp. Proc. 413:571, 1996; Kallinger et al., Synthetic Metals 101: 285-286, 1999; Kajii et al., Synthetic Metals 86:2351-2352, 1997; and Araki et al., Synthetic Metals 77:291-298, 1996, the disclosures of which are hereby incorporated by reference in their entireties) can also be included in the fullerene material, as well as polymeric, copolymeric and crosslinked fullerene compounds and compositions. These compounds per se have been described in the prior art. The fullerene material can also include all physical forms of materials, including, without limitation, solids, gases, vapors, solutions, emulsions, powders, thin films and the like.

Preferred fullerene materials for use in forming the composition of the present invention are fullerene soots or fullerene soot material obtained, for example, from an arc discharge process such as the Kratschmer-Huffman process (see, e.g., W. Kratschmer et al., Nature 1990, Vol. 347 and W. Kratschmer et al., Chem Phys. Lett. 1990, Vol. 170, Issues 2-3, the disclosures of which are hereby incorporated by reference in their entireties). The fullerene soots that are formed by an arc discharge process contain a wide variety of fullerene compounds, including, without limitation, $C_{60}$, $C_{70}$, $C_{76}$, $C_{78}$, $C_{84}$, $C_{90}$, $C_{94}$, $C_{100-250}$, and $C_{250+}$, where a majority of fullerene species in the fullerene soot includes $C_{60}$ and $C_{70}$ (see, e.g., F. Diederich et al., Acc. Chem. Res. 1992, Vol. 25, No. 3). Fullerene soot further contains other soot materials, such as open and incomplete carbon shells that have not completely closed to form fullerenes.

While the use of fullerene compounds in anodes for lithium ion batteries is generally known in the art, what has not been known prior to the present invention is that performance of the anode can be enhanced by providing an electrode composition including fullerene material combined with a carbonaceous material, where the composition has been heat treated at a temperature of about 100° C. or greater so as to enhance the electrochemical properties of the composition. The heat treatment of the composition facilitates the reaction and/or migration or diffusion of fullerene material with the carbonaceous material to yield a modified and enhanced product. In addition, heat treatment of the composition removes at least some fraction of the lower molecular weight fullerenes (i.e., $C_{<100}$ fullerenes, such as $C_{60}$ and $C_{70}$ fullerenes) from the composition. Large amounts of certain lower molecular weight fullerenes in an electrode composition have been determined to be detrimental to electrode performance. Thus, it is preferable that the composition is heat treated to achieve a composition product with a reduced concentration of lower molecular weight fullerenes (i.e., $C_{100}$ fullerenes), while maintaining at least some of the higher molecular weight fullerene compounds (i.e., $C_{100+}$ fullerenes) within the composition product. More preferably, the composition is subjected to heat treatment so as to reduce the $C_{<100}$ fullerene content (e.g., $C_{60}$ and $C_{70}$ fullerenes) in the final composition product by at least about 50% of the initial $C_{<100}$ fullerene content within the fullerene material.

The electrode composition is formed in accordance with the present invention by combining fullerene material, preferably fullerene soot material obtained, for example, from an arc discharge process (e.g., the Kratschmer-Huffman process), with a carbonaceous material, preferably including graphite. The fullerene and carbonaceous materials are mixed, utilizing a ball mill or other suitable mixing process, to form a generally uniform and homogenous blend or composite. The amount of fullerene material in the electrode composition can range anywhere from 1% or less to 99% or greater by weight of the composition. The amount of fullerene material that is combined with carbonaceous material to form the electrode composition influences the performance of the electrode and the lithium ion battery that utilizes the electrode. In particular, the performance of a lithium ion battery is enhanced when the electrode composition in the electrode includes fullerene material in an amount no greater than about 50% by weight of the electrode composition. Preferably, the weight percentage of the fullerene material is no greater than about 20% or about 30%, most preferably no greater than about 10%, of the electrode composition. Depending upon how the electrode composition is processed utilizing heat treatment and/or other techniques as described below, enhanced performance of the anode can be achieved with weight percentages of fullerene material in the electrode composition of no greater than about 5%, about 4%, about 3%, about 2% or even about 1%.

After sufficient mixing of the processed fullerene material with the carbonaceous material to form a composite, the composite is subjected to a heat treatment process to sublime certain fullerene compounds and suitably combine the composite materials (e.g., by reaction and/or diffusion of fullerene and/or other carbon compounds with the carbonaceous material). Heat treatment of the composite involves heating the composite to a temperature of about 100° C. to about 1100° C. or greater for a selected period of time. For example, the electrode composition may be heated at temperatures of about 100° C., about 200° C., about 300° C., about 400° C., about 600° C., about 800° C., and/or about 1000° C. The selection of one or more specific heating temperatures for the electrode composition will be determined based upon a number of factors including, without limitation, the amounts and types of fullerene material, carbonaceous materials and/or other materials that exist in the electrode composition. Heat treatment of the composition is preferably carried out for a period of about 1 minute to about 24 hours or more. Most preferably, heat treatment is carried out for a period of about 3 hours or more. However, shorter or longer heat treatment periods are also possible in forming the electrode composition.

The heat treatment process is also preferably carried out in a vacuum (e.g., about $10^{-4}$ kPa) to facilitate separation and removal of lower molecular weight carbon compounds (e.g., $C_{<100}$ fullerenes) that sublime from the fullerene material. In addition, the heat treatment process may optionally include a controlled cooling of the composite from an upper threshold temperature to about room temperature at rates of about 1° C./min to about 10° C./min. However, slower or faster cooling rates may be used as desired. The fullerene material may be heat treated prior to or, alternatively, after combining with graphite or other carbonaceous materials to form the electrode composition. While heat treatment can be carried out any one or more times during the formation of the electrode composition and the electrode, it is preferred that the composition is subjected to heat treatment at least once after forming the composite of the fullerene material and carbonaceous material.

After heat treatment of the composite, a suitable amount of binder material is preferably added to the composite to facilitate binding together of the carbonaceous and fullerene materials in the composite. Any suitable binder material may be utilized including, without limitation, polymeric binders such as polyvinylidene fluoride, hexafluoropropylene, polyethylene, polyethylene oxide, polypropylene, polytetrafluoroethylene, polyacrylates, substituted derivates thereof, copolymers and any other suitable combinations thereof. An exemplary binder that is suitable for combining with a fullerene soot/graphite composite is polyvinylidene fluoride hexafluoropropylene (PVDF-HFP). The amount of binder material to be provided in the electrode composition is preferably about 1% to about 15% by weight of the electrode composition.

Any suitable method may be utilized to sufficiently combine the binder material with the carbonaceous and fullerene material composite to form a generally uniform and homogenous electrode composition. In an exemplary method, the binder material is first dissolved in a solvent (such as ethyl acetate, cyclopentanone, 1-methyl-2-pyrrolidinone, and/or other suitable solvents), followed by the addition of the carbonaceous and fullerene material composite to the solvent. The fullerene and carbonaceous materials are combined with the binder materials in the solvent utilizing any suitable process (e.g., agitation, sonication, etc.). A slurry is formed including the mixed carbonaceous, fullerene and binder materials and the solvent, and this slurry is uniformly applied (e.g., via a doctor blade) to a current collector or other suitable substrate to form the electrode. The electrode is then dried for a sufficient period of time and preferably under suitable vacuum (e.g., about $10^{-4}$ kPa) to substantially remove the solvent and any other residual moisture from the composition.

The formed electrode is cold pressed (e.g., at about room temperature) at a suitable pressure (e.g., between about 200 kilopascals (kPa) and about 300 megapascals (MPa)) and for a sufficient time (e.g., between about 1 second and about 8 hours) prior to being implemented for use in a lithium ion battery. Optionally, the electrode may be pressed at an elevated temperature (e.g., between about 0° C. and about 250° C.) to achieve a more homogenous distribution of the binder within the electrode composition. Preferably, the temperature during heat pressing will be below the melting point of the binder material (e.g., about 140° C. for PVDF-HFP) so as to maintain the integrity of the composition during pressing. It has been determined that performance of the electrode can be enhanced by heat pressing the electrode in this manner, with an increase in reversible capacity being observed in comparison tests between cold pressed and heat pressed electrodes.

Optionally, the fullerene material may be processed in order to remove or extract a certain amount of lower and/or higher molecular weight fullerenes (e.g., $C_{<100}$ fullerenes and/or $C_{250+}$ fullerenes) from the fullerene material prior to its mixing with carbonaceous material and being subjected to heat treatment. Any number of suitable extraction techniques, such as those generally described above, may be utilized to remove a selected amount of fullerenes of a particular molecular weight range from the fullerene material.

Chemical extraction techniques are particularly useful for separating lower molecular weight fullerenes from fullerene material to yield a processed fullerene material product with a reduced number of $C_{<100}$ fullerenes. For example, two well known extraction solvents are toluene and 1,2,4-trichlorobenzene (TCB). These two solvents are compatible with a number of extraction techniques including, without limitation, continuous extraction of solids with Soxhlet apparatus. The use of toluene and TCB as solvents for separation of fullerenes is described by F. Diederich et al., Acc. Chem. Res., 1992, Vol. 25, No. 3, the disclosure of which is incorporated herein by reference in its entirety.

In the toluene extraction process, a majority of $C_{<100}$ fullerene content can be solubilized and extracted from the remaining insoluble fullerene soot, whereas larger molecular weight fullerenes (i.e., $C_{100+}$ fullerenes) and other carbon material remain in the insoluble fullerene material. In other words, at least 50% of the $C_{<100}$ fullerenes that were initially in the fullerene material can be solubilized and extracted by toluene from the insoluble fullerene material.

While toluene extraction is useful in separating lower molecular weight fullerenes from the fullerene material, the presence of toluene in the insoluble fullerene material product can be detrimental to the electrode composition when implemented in an electrode for a lithium ion battery. To prevent or minimize any negative effects, the insoluble fullerene material is treated with a suitable solvent (e.g., acetone) before and/or after the toluene extraction process to remove any residual toluene as well as any water and/or soluble hydrocarbons that may have been initially present in the fullerene material.

Extraction can also be carried out utilizing other solvents so as to remove and/or isolate selected molecular weight groups of fullerene compounds within the fullerene material. For example, fullerene material can be subjected to TCB extraction to remove $C_{<250}$ fullerenes as soluble extract from insoluble fullerene materials. The TCB extraction may be used in combination with toluene extraction, for example, by performing TCB extraction after toluene extraction. Processing the fullerene material in this manner yields a TCB extract product that includes $C_{100-250}$ fullerenes and/or other fullerene material (e.g., incomplete carbon shells in the $C_{100-250}$ molecular weight range), and a TCB insoluble product that includes $C_{250+}$ fullerenes and/or other fullerene material (e.g., incomplete carbon shells in the $C_{250+}$ range). Alternatively, the fullerene material may be subjected to only TCB extraction to yield fullerene material extract and insoluble fullerene material. Other extraction techniques and/or fullerene generation techniques may also be utilized to further isolate one or more particular molecular weight distribution ranges of fullerene material for use in forming electrode composition of the present invention. The selection of certain molecular weight ranges of $C_{100+}$ fullerene material (e.g., fullerene species having a carbon content of $C_n$, where $100 \leq n \leq 250$) can further enhance the electrochemical properties and performance of the resultant electrode composition. Thus, the invention encompasses the use of any molecular weight range or ranges of $C_{100+}$ fullerenes combined with graphite and/or any other carbonaceous material to form an electrode composition.

As noted above, selection of a specific heat treatment temperature for the composite of fullerene material and carbonaceous material will depend upon a number of factors including, without limitation, the amounts and types of fullerene material, carbonaceous materials and/or other materials that exist in the electrode composition. For example, when forming a composite of graphite and fullerene soot that has not been subjected to any chemical or other extraction process, the heat treatment process is preferably carried out at a temperature of about 600° C. or greater, most preferably about 1000° C. or greater. A fullerene/graphite composite that includes insoluble fullerene soot obtained from toluene extraction is preferably carried out at a temperature of about 600° C. or greater, most preferably about 1000° C. or greater. A fullerene/graphite composite including fullerene soot extract obtained from TCB extraction is preferably subjected to a heat treatment process at a temperature within a range of between about 100° C. and about 400° C. A fullerene/graphite composite including insoluble fullerene soot obtained from TCB extraction is preferably subjected to a heat treatment process at a temperature of about 600° C. or greater, most preferably about 1000° C. or greater.

Another factor that can affect the electrochemical properties of the electrode composition, and thus the performance of the electrode, is the extent to which fullerene material used to form the electrode composition is exposed to oxygen. Fullerenes have been discovered to be highly reactive with oxygen, including atmospheric oxygen. Molecular oxygen from the atmosphere or other sources can be absorbed on the surface of fullerene molecules, resulting in the partial oxidation of the fullerene and dimerization or polymerization. The related art describes the use of $C_{60}$ or $C_{70}$ fullerenes to make some types of fullerene-based electrodes, and has described how to synthesize and purify them. However, no mention is made in the prior art that the materials are to be synthesized and manipulated in the absence of air at all stages. Brief exposure of fullerenes to oxygen may result in a reaction that is only partial, leaving most of the material undisturbed. However, the quantity that does react can negatively affect the electrochemical activity of the bulk fullerene material, making the oxidized fullerene material less useful for battery electrodes.

Thus, it may be desirable in certain scenarios, and depending upon a particular application, that the fullerene materials used to manufacture the electrode composition, as well as electrodes and batteries incorporating the electrode composition, be kept away from oxygen during all stages of production, including fullerene material synthesis and/or processing, formation of the electrode composition and the electrode, cell manufacture and packaging. Providing at least one of a vacuum pressure environment (e.g., subjecting the fullerene material to a vacuum pressure of about $10^{-4}$ kPa) and an inert atmosphere environment (e.g., argon or helium), will ensure that fullerenes within the fullerene material are maintained in a substantially oxygen free environment and do not become oxidized prior to or during production of the electrode and battery in which the fullerene material is used.

The electrode formed with the electrode composition as described above can be implemented for use in a lithium ion secondary battery having any conventional or other selected battery design. In particular, a lithium ion secondary battery may be constructed with an anode including the electrode composition as described above and a positive electrode including a lithium transition metal oxide, where the electrodes are each connected via electrical terminals to a load source and are separated from each other by a suitable lithium ion-soluble electrolyte. During charging of the battery, lithium ions migrate to and intercalate into the anode, while lithium ions deintercalate from the anode and migrate back to the positive electrode during discharging of the battery.

A useful physical parameter that provides an indication of the operational performance of the anode and the lithium ion battery is the reversible capacity of the battery. The reversible capacity, described in units of milliamp hours per gram or mAh/g, represents the amount of lithium ions per gram weight of active material (i.e., the amount of the electrode composition provided in the electrode) that is removed or deintercalated from the anode during a discharging cycle of the battery (i.e., after loading cycle and intercalation of the anode have occurred). In other words, the reversible capacity provides an indication of the charge that can be delivered by the battery during a particular cycle.

While conventional anodes formed from graphite yield a relatively high reversible capacity for lithium ion batteries in the initial charging and discharging cycles, the reversible capacity rapidly decreases or fades over a number of cycles, thus limiting the life of the battery. Incorporating fullerenes into the graphite anode in a known manner as described in the related art, without any processing of the fullerenes as described in the present invention, may provide some enhanced improvement in the reversible capacity. However, the reversible capacity for these fullerene electrodes still decreases considerably over repeated cycles, rendering these electrodes unsuitable for use in batteries requiring a selected level of performance over a long period of use.

The use of an anode in a lithium ion secondary battery, where the anode includes an electrode composition formed in accordance with the present invention, significantly enhances the performance of the battery. In particular, the reversible capacity is substantially maintained over multiple charging/discharging cycles. In addition, controlling the weight percentage of the fullerene material within the electrode composition within the previously described ranges will further enhance the reversible capacity of the anode and thus improve battery performance.

The following examples demonstrate the enhanced battery performance that is achieved when utilizing anodes formed with an electrode composition in accordance with the present invention. In each of the examples, the electrode composition was formed with fullerene soot (manufactured utilizing the Kratschmer-Huffman arc process), graphite and a binder material. Specifically, raw fullerene soot was obtained from Materials & Electrochemical Research (MER) Corporation (Tucson, Ariz.) and BuckyUSA (Houston, Tex.). The graphite utilized to form the electrode composition was Timrex SFG-15 synthetic graphite obtained from Timcal America Ltd. (Westlake, Ohio).

EXAMPLE 1

In this example, raw fullerene soot (obtained from MER corporation) was combined with SFG-15 graphite at a weight percentage of 20% fullerene soot to 80% SFG-15 graphite. The raw fullerene soot was mixed together with the graphite material utilizing a planetary ball mill (Fritch model LC-106A, 80 mL chrome steel bowl, 2 g material, utilizing four 15 mm chrome steel balls at 100 rpm and 30 minutes milling time). The graphite/fullerene soot composite was then heat treated in a fused silica tube under dynamic vacuum ($10^{-4}$ kPa) and at a temperature of 1000° C. for 3 hours. This heating process resulted in the sublimation of at least some lower molecular weight fullerenes (i.e., $C_{<100}$ fullerenes) and other carbon compounds, which formed a black deposit on the cool end of the silica tube, thus separating this sublimed material from the fullerene/graphite composite material. The sublimed fullerene material was prevented from recombining with the fullerene/graphite composite material, such that the heat treated composite material was substantially free of $C_{<100}$ fullerenes. Thus, the $C_{<100}$ fullerene content in the heat treated fullerene/graphite composite was at least less than 50% of the $C_{<100}$ fullerene content in the composite prior to the heat treatment. While a heating temperature of 1000° C. was used, it is noted that lower or higher heating temperatures are also effective in achieving sufficient separation of lower molecular weight fullerenes from the composite material.

After the heat treatment, the graphite/processed fullerene soot composite was mixed with 5% by weight polyvinylidene fluoride hexafluoropropylene (PVDF-HFP, average $M_n$ ca. 110,000, available from Aldrich Chemical Company Inc., Milwaukee, Wis.) copolymer binder dissolved in 2 ml 1-methyl-2-pyrrolidinone (NMP, ACS reagent grade, 99+% Assay, available from Aldrich Chemical Company Inc., Milwaukee, Wis.) in a borosilicate flask with vacuum attachment. The mixture was homogenized by agitation in an ultrasonic bath (model FS30, 130 W, Fisher Scientific Company, Pittsburgh, Pa.) for 20 minutes while under dynamic vacuum ($10^{-4}$ kPa). The resultant slurry was then spread on a copper current collector (99.9% pure copper, available from Alfa Aesar, Ward Hill, Mass.), using a custom doctor blade set-up, to form a circular active material of the electrode composition with a diameter of about 7/16 inch. The electrode was then dried at 130° C. for 1 hour under dynamic vacuum ($10^{-4}$ kPa), removing solvent and residual moisture, and pressed at about room temperature and 5,000 psi (34,470 kPa). The active material had a thickness of approximately 50 micrometers and weighed 3.90 milligrams. A second electrode was prepared in a similar manner as described above, except that the active material was entirely SFG-15 graphite (i.e., contained no fullerene material). The active material of the second electrode was of similar thickness as the active material for the first electrode and had a mass of 5.27 milligrams.

The cell assembly and charge/discharge cycling tests were conducted in argon-filled dry boxes, fitted with re-circulating systems to keep oxygen and water content within the dry boxes below about 1 ppm. A three-electrode cell setup was constructed for each electrode, with the prepared fullerene-graphite electrodes serving as the working electrode in each cell. Each three-electrode cell included a custom-made borosilicate tee fitting to house the cell components. Each of the counter and reference electrodes was constructed by pressing a ½ inch diameter disc of lithium foil (0.75 mm thick, 99.9% pure lithium, available from Alfa Aesar, Ward Hill, Mass.) on the end of a stainless steel electrode (½ inch diameter). The lithium ends of the counter and reference electrodes were then inserted into the opposing open ends of the tee fitting. The working electrode (i.e., including the composite active material) was pressed between the lithium ends of the counter and reference electrodes and separated by a microporous polypropylene membrane separator (Celgard® 2400, Celgard Inc., Charlotte, N.C.), with the copper current collector of the working electrode extending through the third opening of the tee fitting. A nearly constant tension was applied to the reference and counter electrodes to hold them in place within the tee fitting utilizing support blocks that engaged the opposing ends of the reference and counter electrodes (i.e., the electrode ends that extended from the opposing openings of the tee fitting) and retaining springs extending between and attached to the support blocks. Ethylene carbonate/dimethyl carbonate (1:1 w/w) solution containing 1.0 M $LiPF_6$ supporting electrolyte (<10 ppm $H_2O$, Ferro Corporation, Cleveland, Ohio) was added to each tee fitting to cover the electrodes and serve as the electrolyte. Each opening of the tee fitting was sealed with a suitable liquid-tight plug member, and the electrodes were connected in a conventional (three electrode) manner to a battery test system.

The charge/discharge cycles were controlled and measured using the following battery testing systems: Model BT2000 available from Arbin Instruments (College Station, Tex.) and Model MC-4 available from Maccor, Inc. (Tulsa, Okla.). The cells were cycled at about 25° C. and were first charged (i.e., lithium loaded into the active material of the working electrode) at 0.71 $mA/cm^2$ (0.69 mA) to a cut-off voltage of 20 mV vs. lithium metal. Charging was continued at a constant potential of 20 mV vs. lithium metal for 3 hours and then the cell was rested for 1 h. Discharging (removal of lithium from the active material of the working electrode) was carried out at a constant current of 0.71 $mA/cm^2$ to a cut-off voltage of 1.5 V vs. lithium metal. The cells were then rested for 1 hour, completing one cycle. Subsequent cycles were run using the same charging and discharging procedures as the first cycle. Multiple cycles were performed to provide an indication of variations in reversible capacity throughout the cycles.

Figure 1:
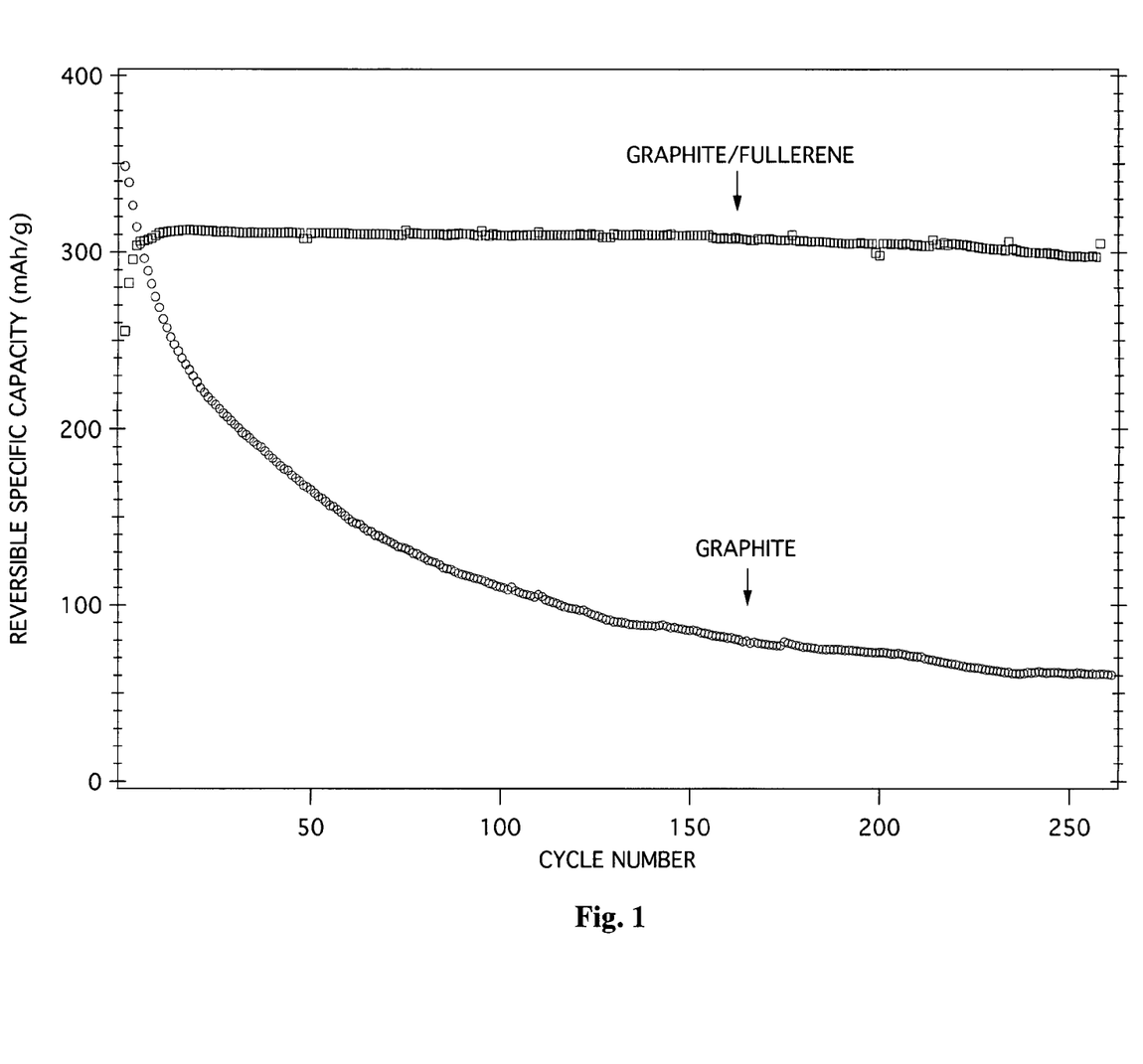
FIG. 1 is a diagram showing the reversible capacities of a lithium cell with a graphite electrode and a lithium cell with an electrode manufactured in accordance with the present invention.

The measured data for the two cells (i.e., the fullerene/graphite electrode cell and the graphite electrode cell) is provided in FIG. 1. Referring to FIG. 1, it can be seen that the cell with the SFG-15 graphite electrode has a high reversible capacity in the first few cycles. However, the reversible capacity rapidly diminishes or fades over the next several cycles. In contrast, the fullerene/graphite electrode substantially maintained a high reversible capacity for a number of cycles and showed minimal capacity fade (as can be seen from the relatively flat curve in FIG. 1).

EXAMPLE 2

In this example, the performance of lithium cells including varied weight ratios of fullerene material to graphite in the working electrode was studied. The electrodes and cells were prepared in the same manner as described above in Example 1 (including the heat treatment at 1000° C. to extract a large portion of the lower molecular weight fullerenes from the graphite/fullerene composite), with the exception that the amount of fullerene to graphite content varied per electrode.

In particular, six electrodes were prepared with active material formed by the following weight percentage combinations of raw fullerene soot material to SFG-15 graphite material: 90:10 (i.e., 90% graphite, 10% raw fullerene soot), 80:20 (i.e., 80% graphite, 20% raw fullerene soot), 60:40 (i.e., 60% graphite, 40% raw fullerene soot), 40:60 (i.e., 40% graphite, 60% raw fullerene soot), 20:80 (i.e., 20% graphite, 80% raw fullerene soot), and 100:0 (i.e., no fullerene material in the electrode composition). The active material for each of the electrodes had a thickness of about 50 micrometers and a mass in the range of about 3 to 9 milligrams. Six lithium cells were prepared utilizing the six working electrodes including varying fullerene soot/graphite ratios, and the cells were charged and discharged over multiple cycles utilizing the same technique described above for Example 1.

Figure 2:
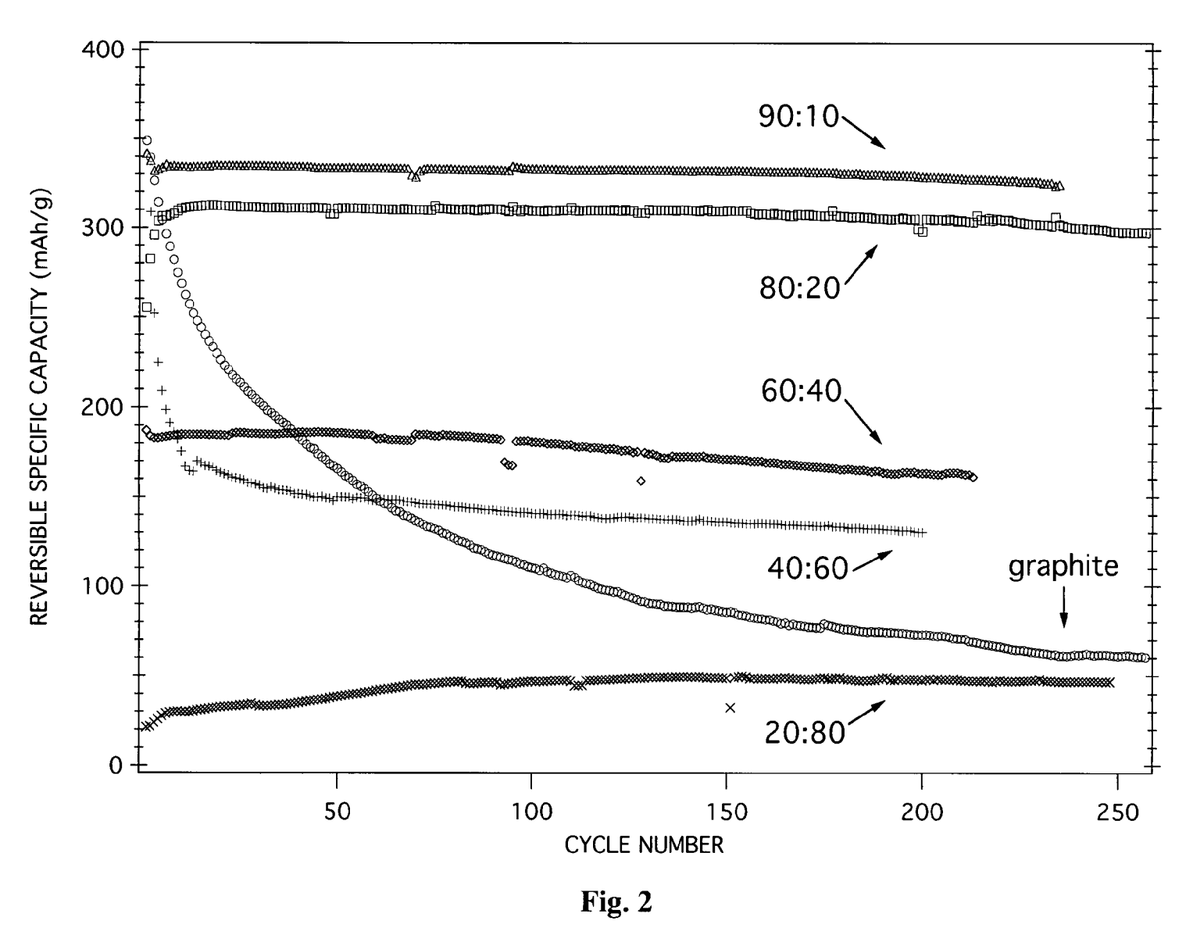
FIG. 2 is a diagram showing the reversible capacities of lithium cells with electrodes manufactured in accordance with the present invention, where the electrodes have been formed with varying amounts of fullerene material mixed with graphite.

The measured reversible capacity vs. the number of cycles tested for each cell is plotted in FIG. 2. Referring to FIG. 2, it can be seen that, as the ratio of fullerene material to graphite within the electrode composition is reduced, there is a resultant increase in reversible capacity. In particular, it can be seen that a 90:10 mixture of graphite to raw fullerene soot yields a reversible capacity that is very close to the initial reversible capacity when utilizing pure graphite for the active material. In addition, it can be seen that each of the electrodes containing a fullerene soot/graphite mix that was subjected to heat treatment experienced relatively low capacity fade (i.e., each has a substantially flat reversible capacity curve) in contrast to the rapid capacity fade observed for the pure graphite electrode.

EXAMPLE 3

In this example, the performance of lithium cells was studied, where the cells included fullerene material that was subjected to varying toluene and heat extraction processes. The fullerene material used to form the electrodes was fullerene soot obtained from BuckyUSA, with active material being formed with a weight percentage ratio of 80% graphite to 20% fullerene soot.

In one process, raw fullerene soot was subjected to a continuous Soxhlet extraction with toluene (HPLC grade, 99.8% Assay, Fisher Scientific Company, Pittsburgh, Pa.). The raw fullerene soot (about 10 g) was loaded into a cotton cellulose extraction thimble (123 mm high, 43 mm interior diameter, 1 mm thick, Whatman Scientific catalog number 2800432) and placed into a Soxhlet extraction tube equipped with a water-cooled condenser and a round bottomed flask charged with toluene solvent. The solvent was brought to reflux and the extraction was allowed to proceed for 48 hours.

In a variation of the toluene extraction process, Soxhlet extraction with acetone (99.5+% Assay, Alfa Aesar, Ward Hill, Mass.) was performed on the raw fullerene soot for 48 hours immediately prior to and again immediately after continuous extraction with toluene. The combination of acetone extraction with toluene extraction substantially removed toluene from the processed fullerene soot material as well as water and/or soluble hydrocarbons that may have been initially present in the fullerene soot.

The extracted fullerene soot material for each Soxhlet extraction process was mixed with graphite in the same manner described above in Example 1. Heat treatment was also applied to the graphite/fullerene soot composite and electrodes were formed in the same manner described above in Example 1, with the exception that the heating temperature was varied depending upon the electrode being formed. In particular, an electrode A was formed with active material including insoluble fullerene soot processed utilizing toluene extraction as described above, where the active material was heated at 1000° C. Electrodes B and C were formed with insoluble fullerene soot obtained from a combined acetone and toluene extraction as described above, where the active material for electrode B was heated at 300° C. and the active material for electrode C was heated at 1000° C.

An electrode D was also formed, where this electrode included only graphite (i.e., no fullerene material). The graphite electrode was heated to a temperature of 1000° C. under vacuum; however, it is noted that this heat treatment of the graphite electrode had no observed effect on its performance.

Five lithium cells, each including a respective one of electrodes A-D, were prepared in the same manner described above in Example 1. The active material for each of the electrodes A-D had a thickness of about 50 micrometers and a mass in the range of about 3 to 9 milligrams. The cells were charged and discharged over multiple cycles utilizing the same technique described above for Example 1.

Figure 3:
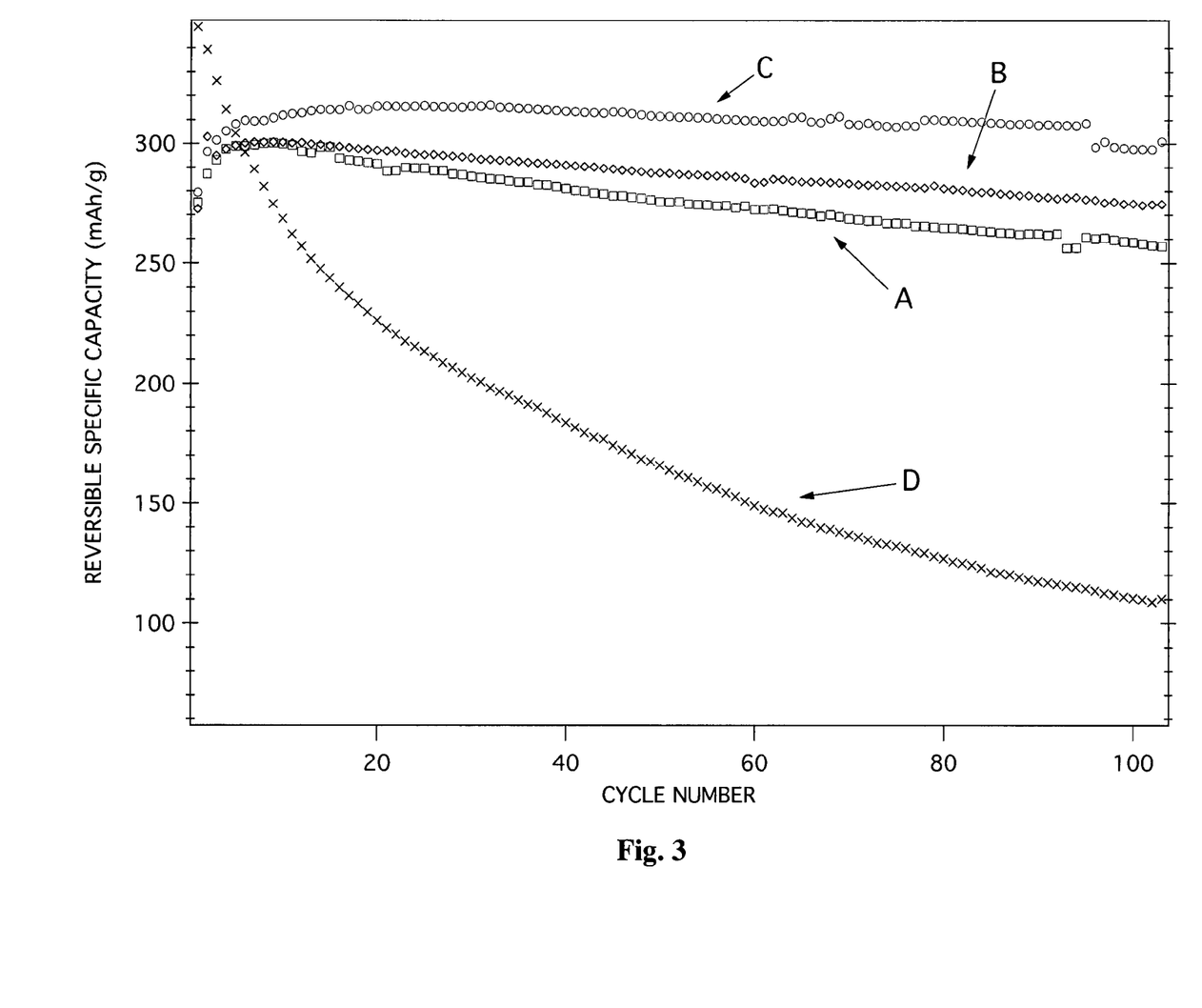
FIG. 3 is a diagram showing the reversible capacities of lithium cells employing different anodes, where some of the cells include electrodes manufactured with fullerene material subjected to different extraction techniques in accordance with the present invention.

The measured reversible capacity vs. the number of cycles tested for each of the cells including electrodes A-D is plotted in FIG. 3. As can be seen in FIG. 3, the reversible capacity for the lithium cells employing electrodes with insoluble fullerene soot obtained from a combination of acetone and toluene extraction followed by heat treatment (i.e., electrodes B and C) maintained a higher reversible capacity over multiple cycles in comparison to the lithium cell employing an electrode with insoluble fullerene material obtained from toluene (but no acetone) extraction followed by heat treatment (i.e., electrode A). However, each of the electrodes with fullerene material that was subjected to some form of toluene extraction yielded a higher reversible capacity over multiple cycles in comparison to electrode D (i.e., the pure graphite electrode). In addition, it can be seen that electrode D experiences relatively rapid capacity fade.

The examples demonstrate a significant improvement in battery performance when utilizing electrodes formed with an electrode composition in accordance with the present invention. These electrodes do not experience rapid capacity fade that is common with conventional graphite electrodes. Thus, electrodes formed in accordance with the present invention yield a much longer battery life with a performance level that is sustained over multiple cycles, rendering the battery useful for a number of long term applications. In addition, the ratio of fullerene material to carbonaceous material in the electrode composition can be controlled to further enhance the reversible capacity of the electrode employed in a lithium ion battery.

Battery performance can be further enhanced by using fullerene material in the anode that has been subjected to one or more suitable extraction techniques, as described above, so as to include certain molecular weight groups of fullerenes. In particular, the use of fullerene species in the anode having a carbon content of $C_{100-250}$ yield a coulombic efficiency that is slightly better over the initial few charging/discharging cycles of battery operation in comparison to anodes formed with fullerenes having a carbon content of $C_{250+}$. The coulombic efficiency measures the electrode capacity that is lost during each charging/discharging cycle and is defined as the ratio of unload or discharge capacity to intercalation or charging capacity.

Having described preferred embodiments of fullerene based secondary cell electrodes and their methods of manufacture, variations and changes will be suggested to those skilled in the art in view of the teachings set forth herein. It is therefore to be understood that all such variations, modifications and changes are believed to fall within the scope of the present invention as defined by the appended claims.

What is claimed:

1. An electrode comprising a composition, wherein the composition comprises a carbonaceous material combined with a fullerene material, the fullerene material including fullerene species having a carbon content of $C_n$, where $n \geq 100$, wherein the fullerene material is free of fluorinated fullerene species.

2. The electrode of claim 1, wherein the weight percentage of fullerene material within the composition is no greater than about 30%.

3. The electrode claim 1, wherein the weight percentage of fullerene material within the composition is no greater than about 20%.

4. The electrode of claim 1, wherein the weight percentage of fullerene material within the composition is no greater than about 10%.

5. The electrode of claim 1, wherein the composition further comprises a binder material.

6. The electrode of claim 1, wherein the carbonaceous material includes graphite.

7. The electrode of claim 1, wherein the fullerene material has been subjected to at least one of a heat treatment process and a chemical extraction process to remove fullerene species having a carbon content less than $C_{100}$ from the fullerene material.

8. The electrode of claim 1, wherein the fullerene material has been subjected to at least one of a heat treatment process and a chemical extraction process to remove fullerene species having a carbon content greater than $C_{250}$ from the fullerene material.

9. The electrode of claim 1, wherein fullerene species have been extracted from the fullerene material by at least one of a toluene extraction process and a 1,2,4-trichlorobenzene extraction process.

10. The electrode of claim 1, wherein the composition has been heated to a temperature between 100° C. and about 1100° C.

11. The electrode of claim 1, wherein the fullerene material includes fullerene soot generated from at least one of an arc discharge process, a laser desorption process, and a combustion flame generation process.

12. The electrode of claim 1, wherein the composition has been formed in a substantially oxygen free environment.

13. A lithium ion battery including the electrode of claim 1.

14. The electrode of claim 1, wherein the composition has been heated to a temperature of about 100° C. or greater.

15. The electrode of claim 14, wherein the composition has been heated to a temperature of about 200° C. or greater.

16. The electrode of claim 14, wherein the composition has been heated to a temperature of about 300° C. or greater.

17. The electrode of claim 14, wherein the composition has been heated to a temperature of about 400° C. or greater.

18. The electrode of claim 14, wherein the composition has been heated to a temperature of about 600° C. or greater.

19. The electrode of claim 14, wherein the composition has been heated to a temperature of about 1000° C. or greater.

20. A composition comprising a carbonaceous material combined with a fullerene material, wherein fullerene species having a carbon content of $C_{<100}$ have been removed from the fullerene material such that the composition is substantially free of fullerene species having a carbon content of $C_{<100}$, and the fullerene material is free of fluorinated fullerene species.

21. The electrode of claim 1, wherein the fullerene species consist of carbon and fullerene atoms.

22. The electrode of claim 14, wherein the composition is substantially free of fullerene species having a carbon content of $C_{<100}$.

* * * * *